(12) United States Patent
Young

(10) Patent No.: US 9,988,021 B1
(45) Date of Patent: Jun. 5, 2018

(54) TRAILER JACK PLUNGER PIN RELEASE SYSTEM

(71) Applicant: Otis Young, Sandy, UT (US)

(72) Inventor: Otis Young, Sandy, UT (US)

(*) Notice: Subject to any disclaimer, the term of this patent is extended or adjusted under 35 U.S.C. 154(b) by 888 days.

(21) Appl. No.: 14/271,140

(22) Filed: May 6, 2014

Related U.S. Application Data

(63) Continuation-in-part of application No. 14/247,508, filed on Apr. 8, 2014, which is a continuation of application No. 14/011,483, filed on Aug. 27, 2013, now Pat. No. 8,714,528.

(60) Provisional application No. 61/805,458, filed on Mar. 26, 2013, provisional application No. 61/765,832, filed on Feb. 18, 2013.

(51) Int. Cl.
*B60P 1/00* (2006.01)
*B60S 9/04* (2006.01)
*B60D 1/66* (2006.01)

(52) U.S. Cl.
CPC . *B60S 9/04* (2013.01); *B60D 1/66* (2013.01)

(58) Field of Classification Search
CPC .......... B60P 1/04; B60P 1/6445; B60P 1/5461
See application file for complete search history.

(56) References Cited

U.S. PATENT DOCUMENTS

| | | | |
|---|---|---|---|
| 3,614,064 A * | 10/1971 | Bennett | B60S 9/04 254/418 |
| 3,951,383 A | 4/1976 | Tenney, Jr. | |
| 4,796,864 A * | 1/1989 | Wilson | B60S 9/08 254/103 |
| 4,848,735 A | 7/1989 | Pittman | |
| 4,944,522 A | 7/1990 | Hart | |
| 4,978,104 A | 12/1990 | Gipson, Jr. | |
| 5,009,444 A | 4/1991 | Williams, Jr. | |
| 5,340,143 A | 8/1994 | Williams, Jr. | |
| 5,421,555 A | 6/1995 | Sims | |
| 5,423,518 A * | 6/1995 | Baxter | B60S 9/08 254/419 |
| 5,564,883 A | 10/1996 | Swanner | |
| 5,629,836 A | 5/1997 | Wright | |
| 5,690,348 A | 11/1997 | Williams, Jr. | |
| 5,803,518 A | 9/1998 | Gibbons | |
| 5,904,342 A * | 5/1999 | Laarman | B60S 9/08 16/406 |
| 6,053,477 A | 4/2000 | Price | |
| 6,086,099 A | 7/2000 | Kingsbury | |

(Continued)

OTHER PUBLICATIONS www.uneedit.com/wegotit/trailer-jacks-stands.php. "Trailer Jack Stands." Published circa Mar. 22, 2013.

(Continued)

*Primary Examiner* — Lee D Wilson
(74) *Attorney, Agent, or Firm* — Durham Jones & Pinegar; Randall B. Bateman; Sarah W. Matthews

(57) ABSTRACT

A lever system for actuating a plunger pin on a trailer jack includes a lever which selectively actuates a plunger pin of the trailer jack. In one configuration an attachment member for attaching the lever to the plunger pin and an engagement member which limits the movement of the lower end of the lever toward the trailer jack. In another configuration, a lever attachment member is used to hold the lever to the jack, and a pin engagement member engages the pin to move it into an open position when the upper end of the lever is moved toward the jack.

21 Claims, 16 Drawing Sheets

(56) References Cited

U.S. PATENT DOCUMENTS

| | | | |
|---|---|---|---|
| 6,260,882 B1 | 7/2001 | Kingsbury | |
| 6,361,023 B1 | 3/2002 | Peavler | |
| 6,439,545 B1 | 8/2002 | Hansen | |
| 6,499,258 B1 * | 12/2002 | Borglum | B60S 9/04 254/418 |
| 6,739,601 B1 | 5/2004 | Fine | |
| 6,764,065 B2 | 7/2004 | Fox | |
| 6,893,006 B2 * | 5/2005 | Drake, III | B60S 9/08 254/419 |
| 6,948,702 B1 | 9/2005 | Nigro | |
| 6,991,050 B1 | 1/2006 | Sanford et al. | |
| 7,097,159 B1 | 8/2006 | Presidio | |
| 7,228,650 B2 | 6/2007 | Curtis | |
| 7,303,210 B2 | 12/2007 | Baxter et al. | |
| 7,325,822 B1 | 2/2008 | Humphreys et al. | |
| 7,611,160 B1 | 11/2009 | Ignacio | |
| 7,775,542 B1 | 8/2010 | Watenpaugh et al. | |
| 8,029,020 B2 | 6/2011 | Henson et al. | |
| 8,322,688 B2 | 12/2012 | Hebert | |
| 8,348,241 B2 | 1/2013 | Trowbridge et al. | |
| 8,376,388 B2 | 2/2013 | Graber | |
| 8,408,522 B2 * | 4/2013 | Birkholz | B60S 9/08 254/418 |
| 8,579,326 B2 * | 11/2013 | Righetti | B60S 9/08 254/418 |
| 8,714,528 B1 | 5/2014 | Young | |
| 9,308,894 B2 | 4/2016 | Lusty | |
| 2003/0094801 A1 | 5/2003 | Fox | |
| 2004/0159827 A1 * | 8/2004 | Drake, III | B60S 9/08 254/425 |
| 2007/0108731 A1 | 5/2007 | McBroom | |
| 2007/0257243 A1 * | 11/2007 | Cofer | B60S 9/08 254/419 |
| 2008/0146397 A1 | 6/2008 | Drake | |
| 2009/0108147 A1 | 4/2009 | Di Biase | |
| 2009/0159863 A1 | 6/2009 | Scott et al. | |
| 2010/0044657 A1 | 2/2010 | Patrick et al. | |
| 2010/0224842 A1 | 9/2010 | Hebert | |
| 2011/0253954 A1 | 10/2011 | Fortner | |
| 2012/0056139 A1 | 3/2012 | Ebbenga | |
| 2014/0252287 A1 | 9/2014 | Young | |
| 2016/0018841 A1 * | 1/2016 | Young | B60S 9/04 280/763.1 |

OTHER PUBLICATIONS www.freewtc.com/products/trailer-jack-2855-12214.htm. "Trailer Jack." Published prior to Mar. 25, 2013.

www.sooning.en.made-in-china.com/product/HbYmzEZCHBcJ/China-Trailer-Jack-SN-TJ9-.html. "Trailer Jack." Published prior to Mar. 25, 2013.

www.tmi-pvc.com/trailer-jack-stands.html. "Tractor Trailer Stands & Jacks." Published circa Apr. 2, 2013.

www.northerntool.com/shop/tools/product_200463044_200463044. "Ultra-Tow Drop Leg Jack." Published circa Sep. 6, 2012.

www.gilmorekramer.com/more_info/trailer_stabilizing_jacks/trailer_stabilizing_jacks.shtml "Trailer Stabilizing Jacks." Published circa Jul. 4, 2013.

\* cited by examiner

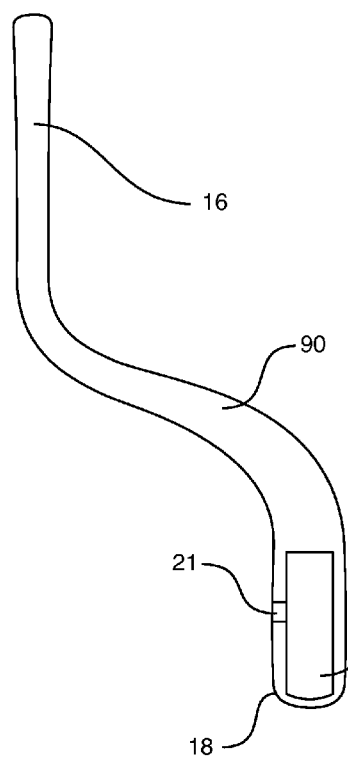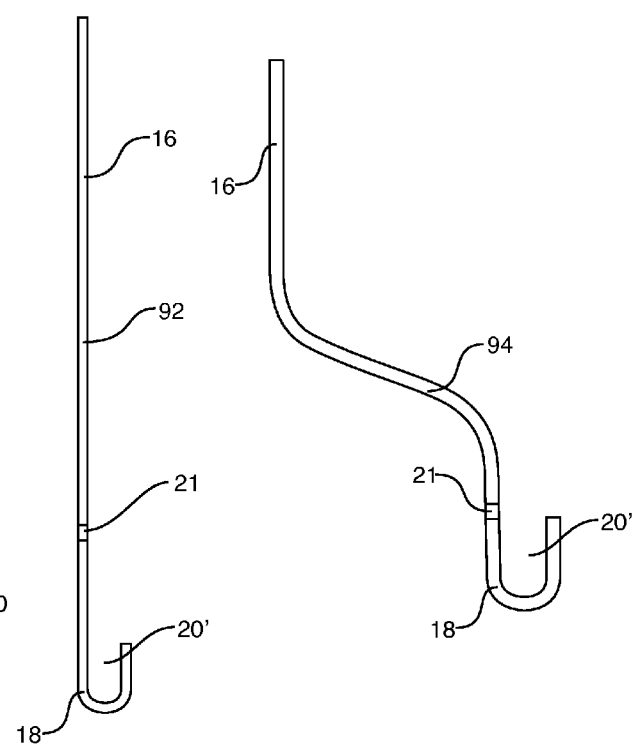
FIG. 6    FIG. 7    FIG. 8

TRAILER JACK PLUNGER PIN RELEASE SYSTEM

BACKGROUND OF THE INVENTION

Field of the Invention

The present invention relates generally to trailer jacks. More particularly, the present invention relates to improved lever systems for assisting the release of plunger pins on trailer jacks such as may be used, for example, on construction trailers, livestock trailers, goose-neck trailers, horse trailers and heavy duty utility trailers.

State of the Art

Trailer jacks are used to lift and/or hold a portion of a trailer at a desired height. The trailer jack may be used, for example, to allow the trailer to be unhitched from a towing vehicle. Likewise, the trailer jack may be used to stabilize the trailer during loading, unloading or other use of the trailer.

Conventional trailer jacks typically include an upper/outer tubing member and a middle/inner tubing member which can be adjusted to telescope in or out of the upper/outer tubing member via a crank or some other structure which allows for fine adjustment of the trailer jack.

Gross adjustment of the trailer jack is provided by a lower/innermost tubing member which slides relative to the middle/inner tubing member. One or both of the middle/inner tubing member and the lower/innermost tubing member typically have a plurality of holes through which a pin can be advanced to hold the lower/innermost tubing member relative to the middle/inner tubing member. Removing the pin from the hole allows the lower/innermost tubing member to slide relative to the middle/inner tubing member, thereby providing gross adjustment.

During travel, the lower/innermost tubing member is typically retracted a substantial amount into the middle/inner tube member and the pin is inserted into the hole. This keeps the lower/innermost tubing member retracted and keeps it from coming into contact with the roadway.

When the jack is needed to support the weight of part of the trailer, the pin is removed from the hole. This allows the lower/innermost tubing member to slide relative to the inner tubing member and into contact with the ground. (Often the lower/innermost tubing member has a foot plate attached thereto which actually rests on the ground and adds lateral stability.) If the innermost tubing member is attached to a biasing member such as a spring, the user will typically press down on the foot plate on the lower/innermost tubing member and counteract the biasing of the spring until the foot plate rests on the ground. The pin is then reinserted through a hole to hold the position of the innermost tubing member relative to the inner tube member. The fine adjust mechanism is then used to extend or retract the middle/inner tubing member relative to the outer-tubing member until the desired height is reached.

Once the trailer jack is no longer needed, the pin is pulled out of the hole to allow the lower/innermost tubing member to retract into the middle/inner tubing member. This may be done by manually lifting the lower/innermost tubing member or by allowing a biasing member, such as a spring, to do so. Once the lower/innermost tubing member is retracted, the pin is again inserted to hold the lower/innermost tubing member in the retracted position.

While jacks significantly improve the usability of trailers, they can be awkward to use. The pins which are used to selectively hold the middle/inner tubing member and the lower/innermost tubing member relatively to one another are often spring loaded and can be difficult to pull out for some people. It can also be hard to both slide the pin out and lift up the lower/innermost tubing member. Additionally, the pin is usually located at a fairly low position and may require a person to get on their knees to crawl part way under the trailer in order to actuate the pin. Thus, there is a need for a lever system to facilitate release of the plunger pin in a more comfortable position.

SUMMARY OF THE INVENTION

The present invention provides a lever system to facilitate the release of a pin on a trailer jack. In accordance with one aspect of the invention the device may include a lever, an attachment member for attaching the lever to the pin, and an engagement member for limiting movement of the lever such that pivoting the upper end of the lever away from the trailer jack moves the pin outwardly and facilitates release of the innermost tubing.

In accordance with one aspect of the invention, the engagement member may comprise a plate which attaches to the housing or sleeve in which the pin slides.

In accordance with another aspect of the invention, the engagement member may include one or more projections or flanges attached to the lever to engage the housing or sleeve in which the pin slides. In the alternative, the projections or flanges may be formed integrally with the lever.

In accordance with yet another aspect of the invention, the lever may include a bent portion so as to facilitate access of the pin from a location lateral from the plane of movement of the lever.

In accordance with yet another aspect of the invention, the lever may include a bottom portion which limits the movement of the lever away from and toward the jack when mounted thereon.

In accordance with another aspect of the invention, the attachment member may pass through the pin to thereby ensure that the lever cannot slide off of the pin.

In accordance with yet another aspect of the invention, the attachment member may form a lever point about which the lever pivots.

In accordance with another aspect of the invention, the lever and the engagement member may be formed from a single piece of material.

In accordance with still another aspect of the invention, the lever system may include a vertical bar having a top end and a bottom end including a lever hole, an optional grip handle attached to the top end of the vertical bar, an attachment member in the form of a bolt designed to attach the vertical bar to a plunger pin of the trailer jack, and an engagement member which may include a sleeve bolt designed to be inserted through a bottom portion of a sleeve of the trailer jack, a bracket plate having a slot designed to be attached to the bottom portion of the sleeve and a pair of U-bolts designed to be positioned on a top portion of the sleeve.

It will be appreciated that each of the aforementioned aspects of the invention as individual aspects and some aspects may be present in some embodiments made in accordance with the principles of the present invention, but no aspect discussed herein is required except as set forth in the individual claims.

The lever system may allow a user to easily release the plunger pin on the trailer jack in standing position with minimum physical effort.

The present invention may also include a member for using an improved lever system to release the plunger pin of the trailer jack.

In accordance with one aspect of the invention, the method may include attaching the lever the curved end of the plunger pin by drilling a hole through the plunger pin and inserting a bolt through the hole to engage the lever.

In accordance with another aspect of the invention, the method may include inserting a sleeve bolt is inserted through the bottom portion of a sleeve surrounding the pin. From a standing position the vertical bar is then bar is the pulled away from the jack at the top, while the bottom end pushes against the pivot bolt and at the bottom portion of the sleeve so as to force the plunger pin to move outwardly.

Alternatively, the method may include using one or more flanges or projections attached to the bottom of the lever to engage the sleeve surrounding the pin to thereby force the pin outwardly when the upper end of the handle is pulled away from the jack.

In accordance with another aspect of the invention, the lever may be attached by an attachment member which allows the lever to pivot and an engagement member which engages the pin such that that movement of the lever toward the jack pulls the pin and releases the lever.

In accordance with another aspect of the invention, the system may include a lever retainer for maintaining the lever in a desired position during transport or other non-use.

In accordance with one aspect of the invention, the attachment member is removably attached to a middle/inner tubing of the jack such that the lever moves up and down with movement of the middle/inner tubing of the jack.

In accordance with another aspect of the invention, the attachment member is releasably attached to a sleeve of the jack which shields the plunger pin.

In accordance with another aspect of the invention, the lever includes a slot for receiving a portion of the plunger pin and an engagement member disposed on the lever for engaging the pin on an opposite side of the lever from the jack.

In accordance with another aspect of the invention, the attachment member may be removably attached to the sleeve of the trailer jack.

In accordance with another aspect of the invention, the attachment member may be permanently attached to at least one of the middle/inner tubing of the trailer jack and/or the sleeve disposed about the trailer jack.

The present invention provides a simple, convenient and improved lever system for assisting the release of plunger pins on jacks, including heavy duty square trailer jacks. The lever system may require only minimum physical effort to be applied by the user to release the plunger pin from the trailer jacks. The lever system may also allow the user to easily push the foot plate of trailer jacks from standing position and hence provides a strain-free ease of use to the user. The lever system may also be easily assembled by the user.

These and other aspects of the present disclosure are realized in a lever system as shown and described in the following figures and related description.

BRIEF DESCRIPTION OF THE DRAWINGS

Various embodiments of the present disclosure are shown and described in reference to the numbered drawings wherein:

FIG. 6 shows a front view of an alternate lever made in accordance with the principles of the present invention;

FIG. 7 shows a front view of an alternate lever made in accordance with the present invention;

FIG. 8 shows a front of an alternative lever in accordance with the principles of the present invention;

Figure 1:
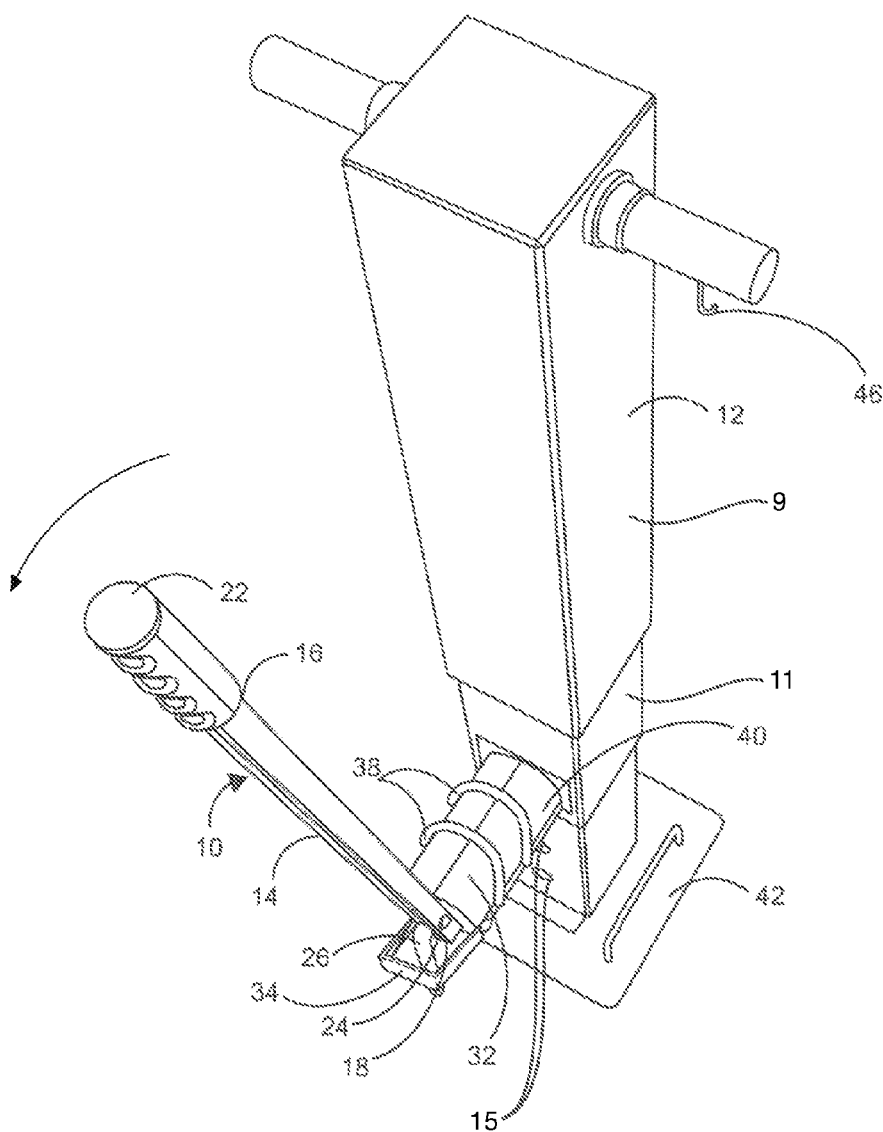
FIG. 1 illustrates a top perspective view of a lever system attached to a trailer jack in accordance with one aspect of the present invention.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The following description includes various representative embodiments and specific details in order to provide a thorough understanding of the present disclosure. The skilled artisan will understand, however, that the methods and devices described below can be practiced without employing these specific details, or that they can be used for purposes other than those described herein. Indeed, they can be modified and can be used in conjunction with products and techniques known to those of skill in the art in light of the present disclosure.

Reference in the specification to "one configuration," "one embodiment" "one aspect" or "a configuration," "an embodiment" or "an aspect" means that a particular feature, structure, or characteristic described in connection with the configuration may be included in at least one configuration and not that any particular configuration is required to have a particular feature, structure or characteristic described herein. The appearances of the phrase "in one configuration" or similar phrases in various places in the specification are not necessarily all referring to the same configuration, and may not necessarily limit the inclusion of a particular element of the invention to a single configuration, rather the element may be included in other or all configurations discussed herein. Thus it will be appreciated that the claims are not intended to be limited by the representative configurations shown herein. Rather, the various representative configurations are simply provided to help one of ordinary skill in the art to practice the inventive concepts claimed herein.

The invention and accompanying drawings will now be discussed in reference to the numerals provided therein so as to enable one skilled in the art to practice the present invention. The drawings and descriptions are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Furthermore, the described features, structures, or characteristics of configurations of the invention may be combined in any suitable manner in one or more configurations. In the following description, numerous specific details are provided, such as examples of products or manufacturing techniques that may be used, to provide a thorough understanding of configurations of the invention. One skilled in the relevant art will recognize, however, that configurations of the invention may be practiced without one or more of the specific details, or with other methods, components, materials, and so forth. In other instances, well-known structures, materials, or operations are not shown or described in detail to avoid obscuring aspects of the invention.

Prior to discussing particular configurations, it should be understood that the present invention is not limited to any particular structures, process steps, or materials discussed or disclosed herein, but is extended to include equivalents thereof as would be recognized by those of ordinary skill in the relevant art. More specifically, the invention is defined by the terms set forth in the claims. It should also be understood that terminology contained herein is used for the purpose of describing particular aspects of the invention only and is not intended to limit the invention to the aspects or configurations shown unless expressly indicated as such. Likewise, the discussion of any particular aspect of the invention is not to be understood as a requirement that such aspect is required to be present apart from an express inclusion of the aspect in the claims.

It should also be noted that, as used in this specification and the appended claims, singular forms such as "a," "an," and "the" may include the plural unless the context clearly dictates otherwise. Thus, for example, reference to "a spring" may include one or more of such springs, and reference to "the layer" may include reference to one or more of such layers.

As used herein, the term "substantially" refers to the complete or nearly complete extent or degree of an action, characteristic, property, state, structure, item, or result to function as indicated. For example, an object that is "substantially" enclosed would mean that the object is either completely enclosed or nearly completely enclosed. The exact allowable degree of deviation from absolute completeness may in some cases depend on the specific context, such that enclosing the nearly all of the length of a lumen would be substantially enclosed, even if the distal end of the structure enclosing the lumen had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Turning now to FIG. 1, there is shown a top perspective view of trailer jack 12 having a lever system, generally indicated at 10, attached thereto in accordance with the present invention. The trailer jack 12 includes an upper/outer tubing member 9, a middle/inner tubing member 11, and a lower/innermost tubing member 13. (While this is conventional arrangement for a trailer jack, it will be appreciated that which tubing member is on the inside could be modified). While an adjustment mechanism such as a crank arm is typically provided to move the middle/inner tubing member 11 with respect to the upper/outer tubing member 9, such as been omitted from FIG. 1 in order to focus on the lever system.

The lower/innermost tubing member 13 also moves relative to the middle/inner tubing member 11. The lower/innermost tubing member 13 may, for example, include a plurality of holes 15. A pin, such as plunger pin 26, selectively engages the holes to control extension of the lower/innermost tubing member 13. With the pin 26 removed, the lower/innermost tubing member can either slide downwardly under its own weight, or can be pulled upwardly by a spring or other biasing member. If no biasing member is present, the user must typically lift the lower/innermost tubing member 13 upwardly when moving the trailer. If a biasing member is included, the lower/innermost tubing member 13 may move upwardly on its own, and the user must typically place a downward force on a foot plate 42 to extend the lower/innermost tube.

The improved lever system 10 may include a lever 14 (shown as a generally vertical bar) having a top end 16 and a bottom end 18. Disposed along the lever 14 may be a lever hole 20, a grip handle 22 attached at or adjacent the top end 16 of the lever, and a bolt 24 or other pivot designed to attach the lever 14 to the plunger pin 26 of the trailer jack 12. The lever system 10 may also include a sleeve bolt 28 designed to be inserted through a bottom portion 30 of a sleeve 32 which holds the plunger pin 26 of the trailer jack 12, a bracket plate 34 having a slot 36 designed to be attached to a bottom portion of the sleeve 30 and a pair of U-bolts 38 designed to be positioned on a top portion of the sleeve 40.

The lever system 10 allows a user to easily release the plunger pin 26 on the trailer jack 12 in standing position with minimum physical effort. This is done by pulling on an upper end 16 of the lever 14 away from the trailer jack 12. As the lever 14 rotates about the bolt 24 or other pivot, the lower portion 18 of the lever engages the sleeve 40 or structures attached thereto, thereby causing the lever 14 to slide the plunger pin 26 away from the jack 12, thereby removing the plunger pin 26 from a hole 15 in which it was positioned. Thus, in turn, releases the lower/innermost tubing member 13 for movement relative to the middle/inner tubing member 11.

Figure 2:
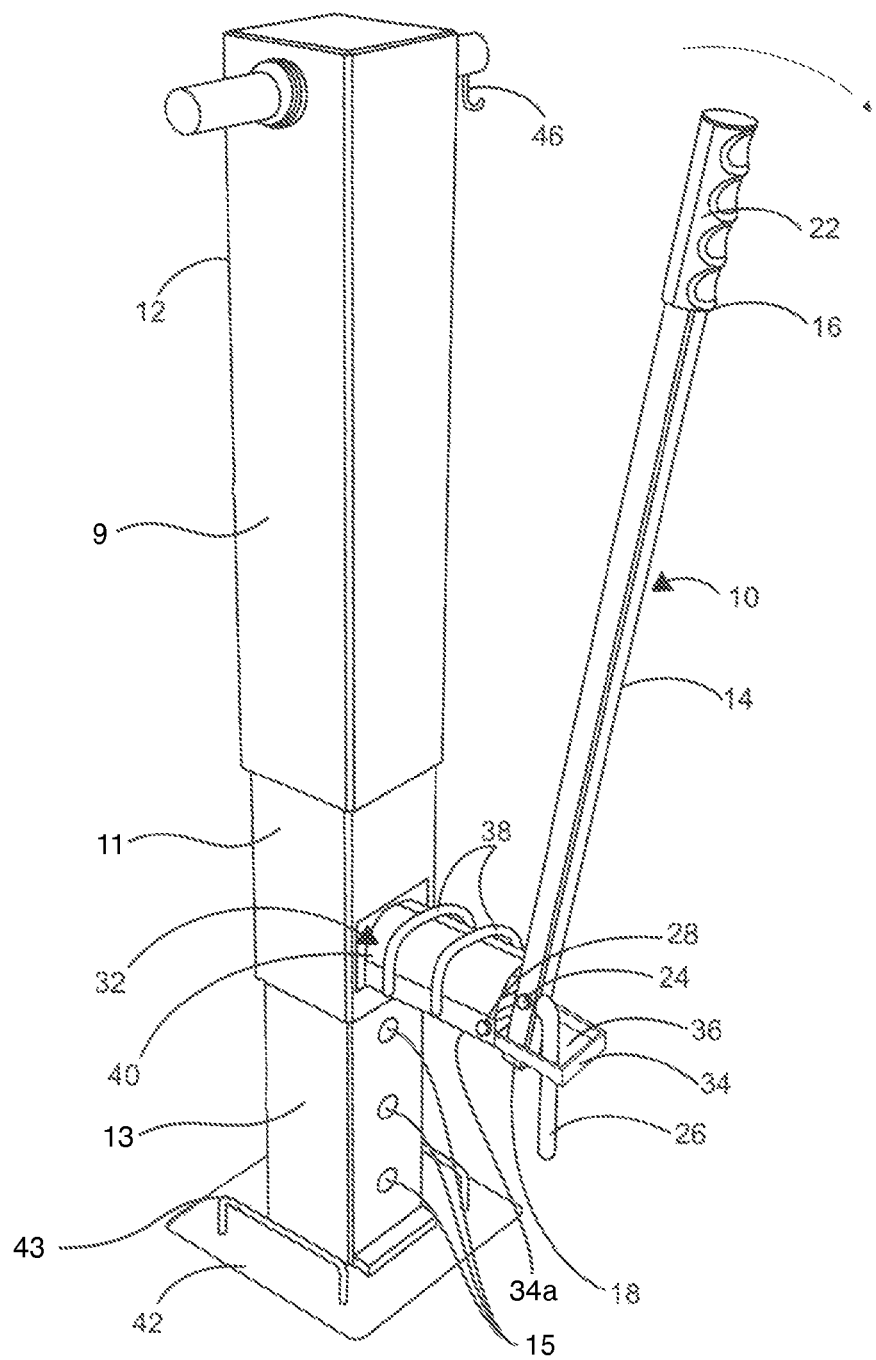
FIG. 2 illustrates a side perspective view of a lever system attached to the trailer jack in accordance with one aspect of the present invention.

Turning now to FIG. 2, there is shown a side perspective view of the improved lever system 10 attached to the trailer jack 12 in accordance with one aspect of the present invention. The plunger pin 26 includes a drilled hole (not shown) which allows a pivot bolt or other attachment member which allows pivoting (e.g. conventional bolt, rivet or other pivot-collectively referred to herein as a pivot bolt) 24, to be inserted through the drilled hole. (The hole in the plunger pin could be formed in the pin during manufacture or could be added later as an aftermarket modification to facilitate use of the lever system 10.

The pivot bolt 24, or other pivot point, is allowed to pass through the lever hole 18 (FIG. 3) and then through the drilled hole (not shown) in the plunger pin 26 to firmly secure the lever 14 to the trailer jack 12. As long as the pivot bolt 24 or other pivot pin passes through the plunger pin, the lever 14 will remain on the plunger pin 26 and attached to the trailer jack 12.

In one configuration, the pair of U-bolts 38 may be kept on the top portion of the sleeve 40 and nuts 48 are positioned on the bottom portion of the bolt (not shown) on the opposing side of the bracket plate 34. The lever bar 14 is then taken separately and pulled on so that the pivot bolt 24 will hold onto the plunger pin 26. The lever 14 forcefully engaging at the back of a front portion 34a of the bracket plate 34, and/or against a sleeve bolt 28 extending though the sleeve 40, forces the plunger pin 26 to move outward. The bracket plate 34 may continue with a rearward section 34b which limits rearward (i.e. away from the trailer jack 12) movement of the bottom 18 of the lever 14 to prevent the upper end 16 of the lever 14 from falling forward into the trailer jack 12.

A method for using the improved lever system 10 to release the plunger pin 26 of the trailer jack 12 may be initiated by attaching the generally vertical lever 14 to the curved end (not shown) of the plunger pin 26. The plunger pin 26 may then be drilled directly through a central part of the curved portion to form the drilled hole (not shown). The lever system 10 may be attached by inserting the pivot bolt 24 through a lever hole 20 in the lever 14 and into a hole (not shown) which can be formed or drilled into the plunger pin 26. This leaves the lever 14 to pivot about the pivot bolt 24 (or the like).

A sleeve bolt 28 may then be inserted through the bottom portion of the sleeve 40 and/or the bracket 34 can be positioned so that it has an engagement edge near the outer end of the sleeve. The lever 14 may then pulled away from the trailer jack 12 at the top end 16 of the lever, while the bottom end 18 pivots about the pivot bolt 24 (or other pivot structure) and at the bottom portion of the sleeve 40 so as to force the plunger pin 26 to move outward. A foot plate 42 of the trailer jack 12 can be pushed down by placing a foot on it or can be pulled up by simply pulling the lever system 10 to make the trailer jack 10 returns to the original position with very little effort if it is spring loaded. FIG. 2 shows a hook 46 and a handle 43 which can be used to attach a spring to facilitate auto-retraction, as it is easier to push the lower/innermost tubing member down with one's foot.

If the trailer jack 12 does not include a spring or other biasing member, pulling the lever will release the lower/innermost tubing member 13 and allow it to slide to the ground. To retract the lower/innermost tubing member 13, the user can lift up on a handle 43 with a hand or foot to return the lower/innermost tubing member to its retracted position.

Figure 3:
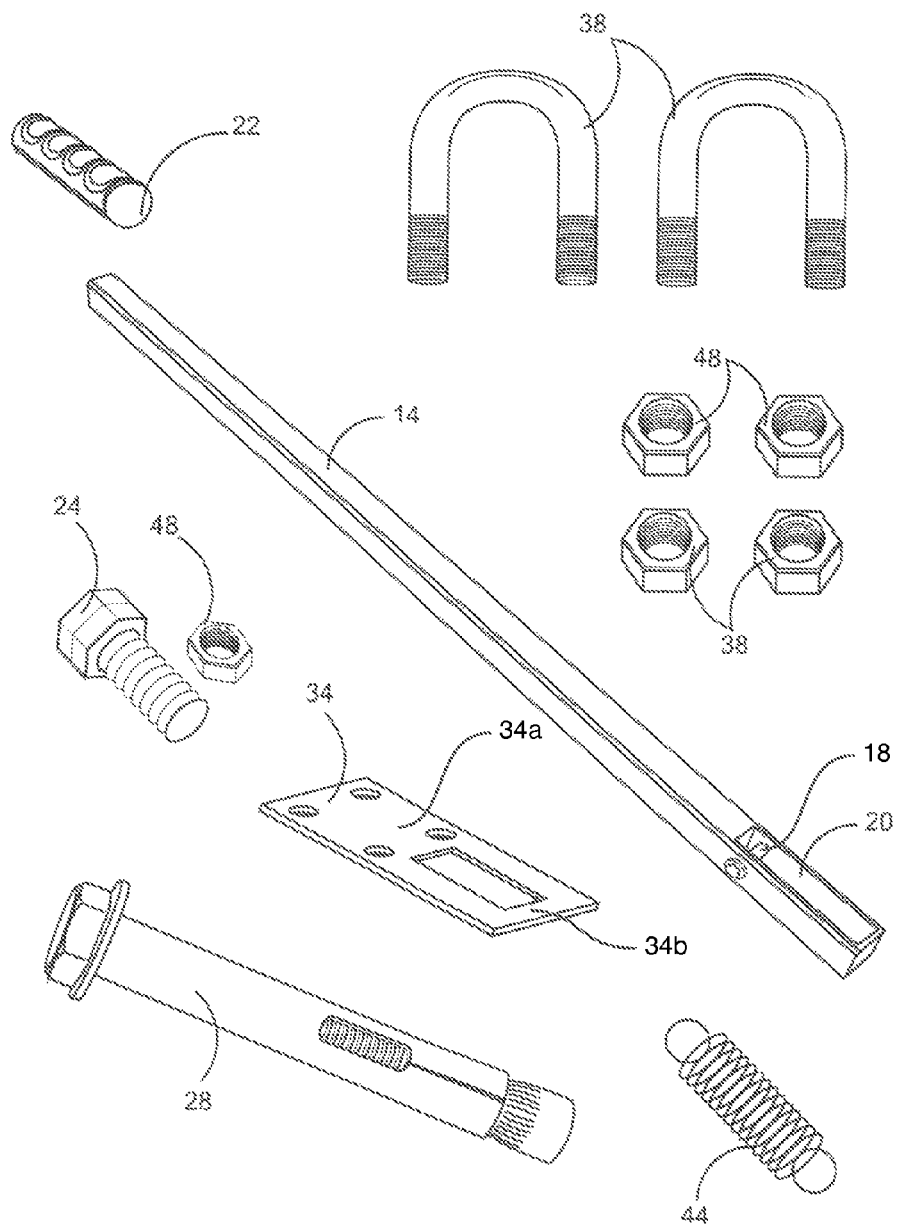
FIG. 3 shows an exploded view of a lever system in accordance with one aspect of the invention as shown in FIGS. 1 and 2.

FIG. 3 illustrates an exploded view of the improved lever system 10 of the present invention. The bar which forms the lever 14 of the lever system 10 can be a one inch square bar tubing steel. The slot 20 formed in the lower end is intersected by the bolt 24 which serves as the attachment member for attaching the lever to the pin 26. Depending on its size, the slot 20 in the lever 14 can allow movement of the pin 26, outwardly, but will engage the end of the pin 26 to prevent the lever 14 from falling too far forwardly.

The pivot bolt 24 and the sleeve bolt 28 may be, for example, ¼ inch in diameter. The pair of nuts 48 and U-bolts 38 may be used to attach the plate 34 to the sleeve 40 (not shown in FIG. 3). This can be by the plate 34 resting on the inside of the nuts, or the plate 34 could have holes formed therein so that the U-bolts pass through the plate. The pair of U-bolts 38 may be kept on the top portion of the sleeve 40 and nuts 48 are positioned on the bottom portion of the bolt (not shown) through the bracket plate 34.

A grip handle 22 may be used to provide easier gripping to the user. The lever system 10 may also include an optional spring 44 that can be used with jacks that are not already spring loaded. Springs can be easily added to the outside of the jack 12 by attaching one end of the spring 44 to a J-hook 46 of the jack 12 and other end to the handle 43 or a hole in the foot plate 42 (FIG. 2). The spring 44 makes the setting and releasing of the trailer jack 12 much easier. For some trailer jacks, the sleeve may be too short and hence there will be no space for the lever system 10 to work against effectively. In such cases, the bracket plate 34 can be attached with U bolts or welded to the bottom portion of that sleeve which will create a place for the lever system 10 to push against.

Figure 4:
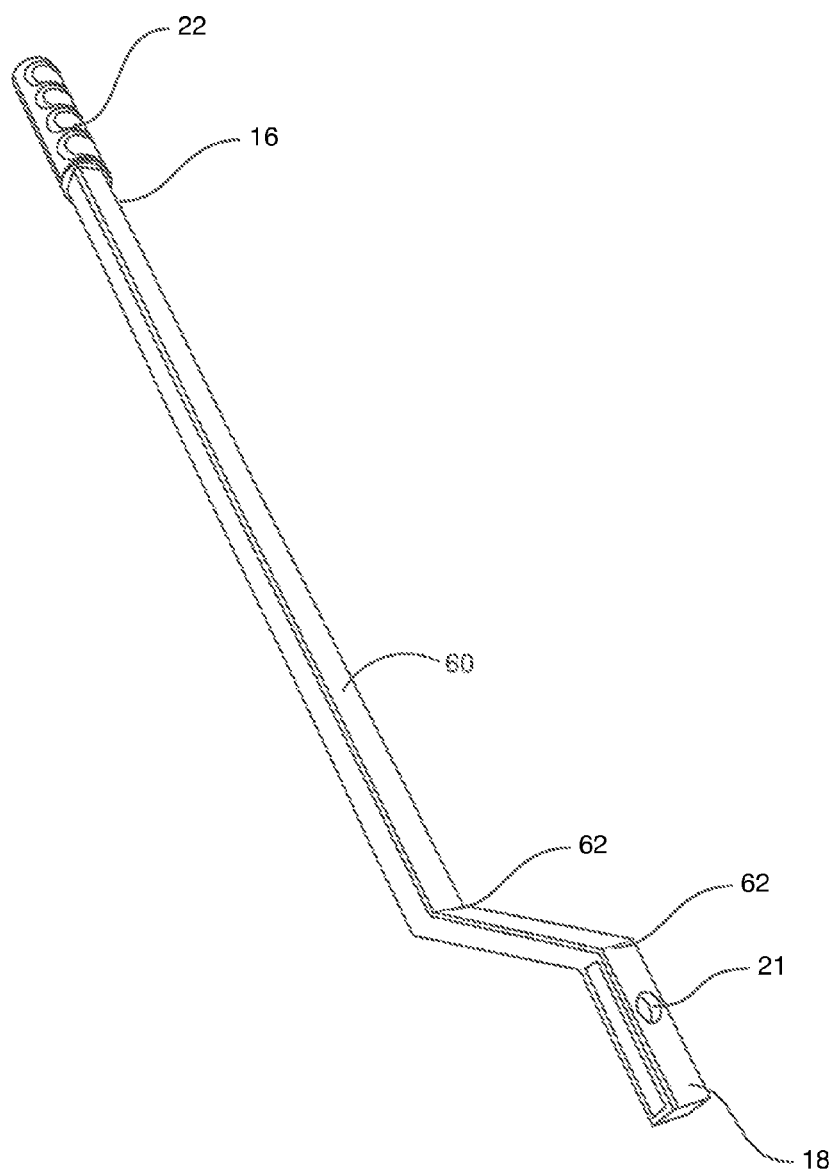
FIG. 4 shows a perspective view of another lever in accordance with another aspect of the present invention.

FIG. 4 illustrates an alternate embodiment of the vertical bar shown in FIG. 1 which forms the lever 60. The lever 60 functions in the same manner as lever 14. However, due to the bends 62 in the lever 60, the upper end 16 and the lower end 18 are offset from one another. This allows the upper end 16 to be placed in a more convenient location or for the lever to be used when some structure (such as the tongue of the trailer) prevents a generally straight lever from being used. While using this lever 60, the tedious task of releasing or setting the horse trailers can be accomplished easily without having to bend down on knees or exerting energy to release the plunger pin.

It will be appreciated that the present invention is particularly useful with heavy duty square trailer jacks, but it may be used with other jacks as well. The lever system 10 of the present invention provides a simple, convenient and improved lever tool for assisting the release of plunger pins on heavy duty square trailer jacks. The tool requires only minimum physical effort to be applied by the user to release the plunger pin from the trailer jacks. The lever system 10 also allows the user to easily push the foot plate 42 of trailer jacks from standing position and hence provides a strain-free ease of use to the user. The lever system 10 can be easily assembled by the user. The lever system 10 can be made of a light-weight material. Alternately, the lever system 10 can be made of steel or a variety of other materials.

Figure 5A:
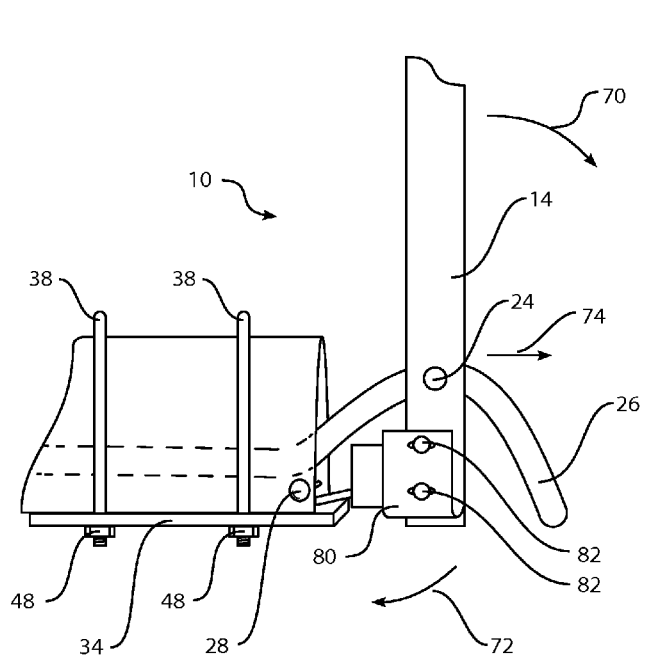
FIGS. 5A and 5B shows side and end views of various configurations of lever systems made in accordance with principles of the present invention.
Figure 5B:
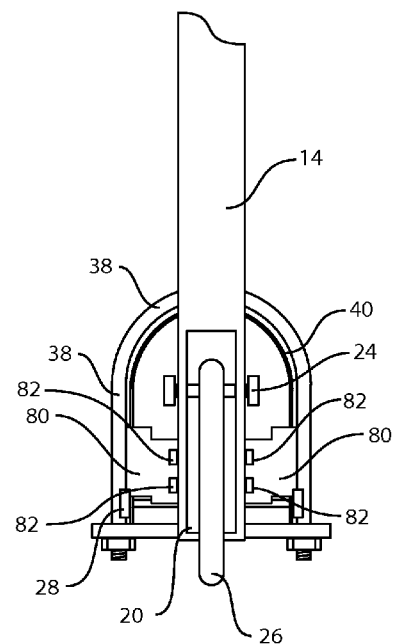

Turning now to FIGS. 5A and 5B, there is shown a side view and an end view of lever systems which may be used in accordance with the principles of the present invention. Referring specifically to FIG. 5, there is shown a side view of the lever 14 which is attached at a pivot point to the pin 26 by an attachment mechanism or member in the form of a bolt 24. The bolt holds the lever 14 to the pin 26, but allows the lever 14 to pivot.

The lever system 10 also includes an engagement mechanism or member which is engaged by the lower end 18 of the lever 14. FIG. 5A shows three different engagement members which can be used individually. Alternatively, two or more can be used. In other words, pulling on the upper end 16 (FIG. 1—not shown in FIG. 5A) of the lever 14 in the direction indicated by arrow 70 causes the lower end 18 of the lever to be advanced as indicated by arrow 72. Movement of the lower end is stopped by engagement with one of the engagement members. Thus, movement of the lower end 18 may be stopped by engagement with the bracket plate 34 attached to the bottom of the sleeve 40 by the U-bolts 38. Likewise, movement of the lower end 18 may be stopped by engaged with the sleeve bolt 28 which extends between opposing sides of the sleeve.

Yet another engagement member which can be used includes a protrusion, such as an abutment or flange 80 which can be attached to the lever 14. The flange 80 extends outwardly so as to engage the ends of either or both side of the sleeve 40 about the pin 26. When the flange 80 engages the sleeve, the lower end 18 of the lever 14 can no longer advance.

Once the lower end 18 engages one or more of the engagement members (plate 34, bolt 28 or flange 80/sleeve 40), continued movement of the upper end of the lever in direction of arrow 70 causes everything above the lower end to move in a similar direction, including the bolt 24 which passes through the pin 26. This causes the pin 26 to move in direction of arrow 74 and causes the pin to disengage the lower/innermost tubing member 13 (FIG. 1), whereby allowing it to telescope out or retract into the middle/inner tubing member 11. The user need not get on his or her hands and knees to grab the pin 26. Rather, a simple pull on the upper end of the lever is sufficient.

As shown in FIG. 5A, the abutment or flange 80 can be attached to the lever 14 by bolts, rivets 82 or other known attachment techniques including welding. The abutment or flange 82 may also include channels so that the distance they protrude from the lever can be adjusted for various types of sleeves 40.

FIG. 5B shows an end view of the configuration in FIG. 5A. As indicated, the lower end 18 may engage the sleeve 40 via the plate 34, the bolt 28 or the abutment member or flange(s) 80 attached to the lever engaging the end of the sleeve. This stops the forward movement of the lower end and causes the lever 14 to move the pin 26 rearwardly.

Additionally, FIG. 5B shows better how the longer end of the curved portion of the pin 26 ends below the end of the slot 20 in the lever. If the upper end of the lever 14 attempts to move too far toward the trailer jack 12, the lower end 18 may engage the pin 26 and prevent the lever from contacting the trailer jack. This may help prevent cosmetic damage to the lever and the trailer jack. It will also be appreciated that having a plate 34 with a slot as shown in FIGS. 1-3 can serve the same function by the back side of the plate 34*b* engaging the lower end 18 of the lever 14.

Figure 5C:
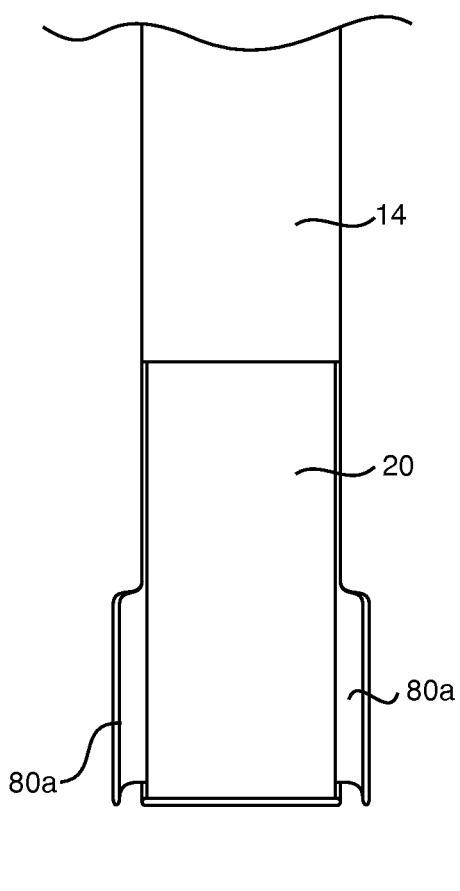
FIGS. 5C and 5D show close-up views of an alternate embodiment wherein the flanges are formed integrally with the lever.
Figure 5D:
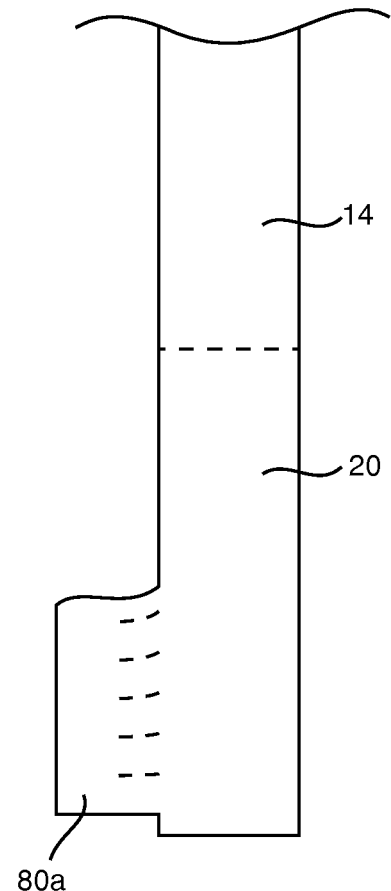

While the abutment member or flanges 80 can be formed separately from the lever 14, as shown in FIGS. 5C and 5D, the flanges 80*a* can be formed integrally with the lever, as well. This could be done, for example, by using some or all of the portion of the sidewall of the lever which is cut to form the channel 20. Instead of completely removing a portion of the sidewall, it can be cut and then bent so that it projects outwardly from the lower portion of the lever. One or more abutment member or flange 80*a* can be used to engage the end of the sleeve 40 (FIG. 5A) which partially surrounds the plunger pin 26 (FIG. 5A) in a similar manner as shown in FIGS. 5A and 5B. By engaging one or both sides of the sleeve 32, the abutment members or flanges 80*a* prevent forward movement of the lower end of the lever 14 and allow the lever to pull the plunger pin 26 outwardly.

Turning now to FIG. 6, there is shown an alternate configuration of a lever 90 which may be used in accordance with the present invention. The lever 90 is formed from a piece of tubular steel. However, it includes an upper end 16, a lower end 18 a hole 21 and slot 20 so as to function in a manner similar to lever 14 in FIGS. 1-3 and 5A-5B. The lever 90 is also bent to facilitate use away from the center plane of the pin and lower end 18 of the lever.

Turning now to FIG. 7, there is shown an alternate configuration of a lever 92. The lever includes an upper end 16 and a lower end 18, along with hole 21 for the bolt 24 (not show) to attach the lever to the pin 26 (not shown). However, rather than a slot cut into tubing, the lever 92 is make from a single piece of metal (or the like) and is bent to form a channel, to provide both for engagement and a channel 20' for movement of the pint 26.

FIG. 8 shows yet another configuration of a lever 94, wherein the lever is formed from a single, generally flat piece of metal which has been into a shape similar to that shown in FIG. 6. It will be appreciated that the configurations shown in FIGS. 7 and 8 could have the lower end of the piece of metal extend upwardly sufficiently that the pivot bolt 24 can extend through the lever twice, thereby forming a structure more analogous to the slot 20 in FIG. 1.

Figure 9:
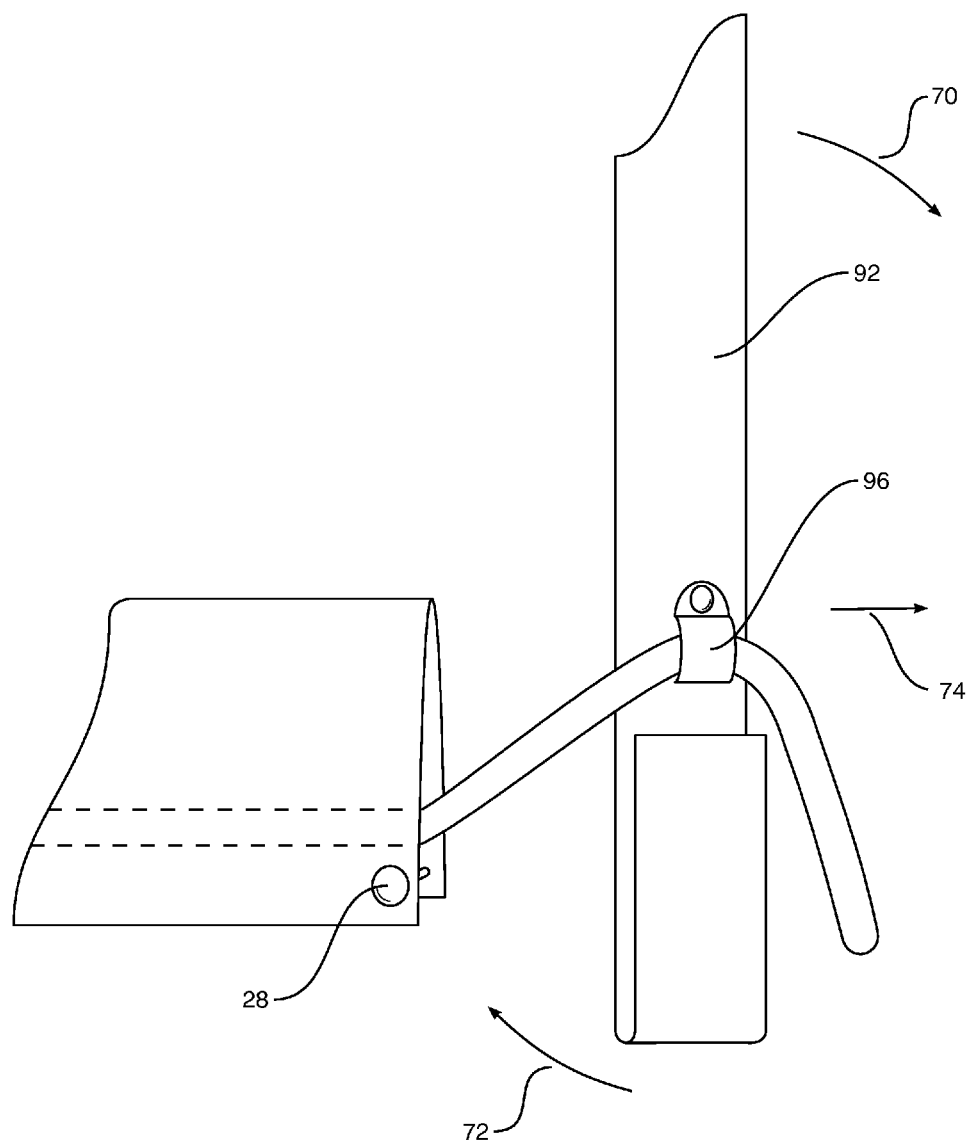
FIG. 9 shows an alternate attachment mechanism in accordance with principles of the present invention.

Turning now to FIG. 9, there is shown an alternate configuration of the present invention. The lever 92 is attached to the pin 26 by a clamping member 96 and a bolt 24 extending through the hole 21 (FIG. 7) rather than drilling through the pin itself. While such a configuration may be a little less secure, it is easier for those not comfortable with drilling through the pin 26.

In use, the lever 92 is pulled in the same manner discussed with respect to FIG. 5B. The lower end 18 of the lever 92 pivots in and engages the sleeve pin 28 as shown by arrow 72 in response to movement of the upper end of the lever in direction of arrow 70. (The other engagement members—plate 34 or abutment/flange 80—could also be used). Once the lower end 18 engages the engagement member (28, 34, 40/80), continued movement of the lever 92 in direction 70 causes the clamping member 96 and pin 26 to move in the direction of arrow 74, thereby releasing the pin and allowing the lower/innermost tubing member 11 (FIG. 1) to slide in or out of the middle/inner tube.

Figures 10A, 10B:
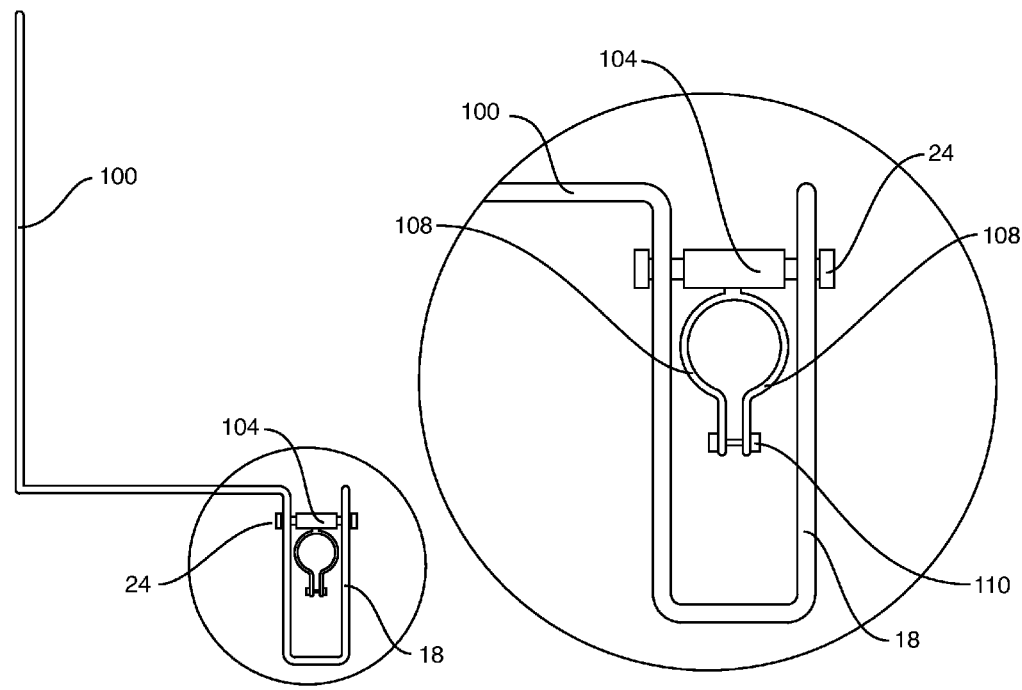
FIG. 10A shows a front view of an alternate configuration of a lever mechanism in accordance with the principles of the present invention.
FIG. 10B shows a close-up of the lower end of the lever.
Figure 10C:
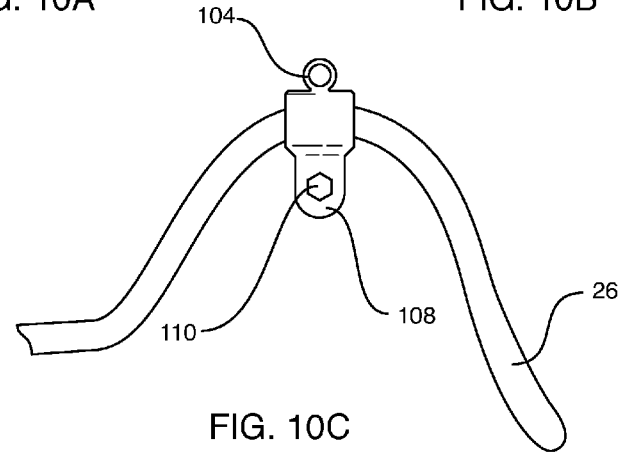
FIG. 10C shows a close-up view of a clamp portion of the lever mechanism of FIG. 10A being attached to a pin.

Turning now to FIGS. 10A-10C, there is shown an alternate configuration of a lever, generally indicated at 100. The lever 100 may be made from a single piece of bent metal or other material, or may be tubular similar to some of the levers discussed above. The lever 10 has a lower end 18 which is bend or formed to make a channel for receiving a pin 26 (FIG. 10C). Unlike the configurations wherein the pivot point, such as a pivot bolt 24 (etc.), passes through the pin, the pivot point passes through a pivot sleeve 104.

The pivot sleeve 104 may extend completely around the pivot bolt 24 or may cover only sufficient area to allow the two to rotate with respect to one another. The pivot sleeve 104 may be formed integrally with or attached to a clamping member 106. The clamping member 106 may include opposing arms 108 which can be clamped toward one another by a clamping bolt 110. Thus, tightening the clamping bolt 110 draws the arms 108 toward each other and allows the clamping member 106 to be secured to the pin 26 as shown in FIG. 10C. The lever 100 can then be positioned so that the pivot bolt 24 (etc.) can be extended through the lower portion 18 of the lever and the pivot sleeve 104 to thereby secure the lever to the pin 26. Once attached, the lever 100 will function in substantially the same way as the levers discussed above. However, it has the advantage that it does not require drilling, but creates a much stronger attachment than would a set screw or some other structure which merely engages a very small area on the pin.

Figure 11:
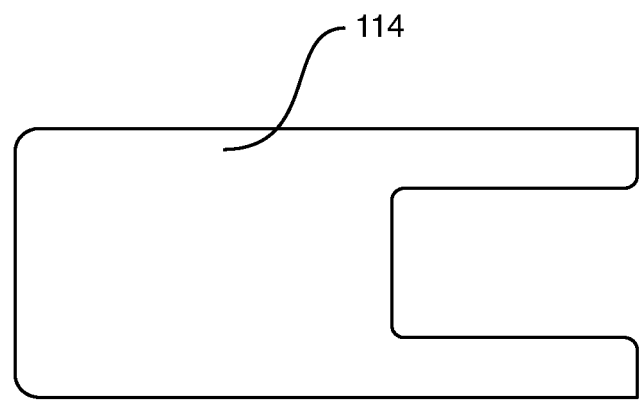
FIG. 11 shows an alternate configuration of a bracket plate as may be used with the present invention.

Turning now to FIG. 11, there is shown a top view of a bracket plate 114. The front portion 114a of the bracket plate is similar to the front portion 34a of the bracket plate 34 shown in FIG. 3. The back portion 114b includes arms 116, but is open back. Thus, the bracket plate 114 allows greater reward movement of the lever, but still provides lateral support to prevent the lever from tipping to either side once the pin has been moved by rotating the lever.

Figure 12:
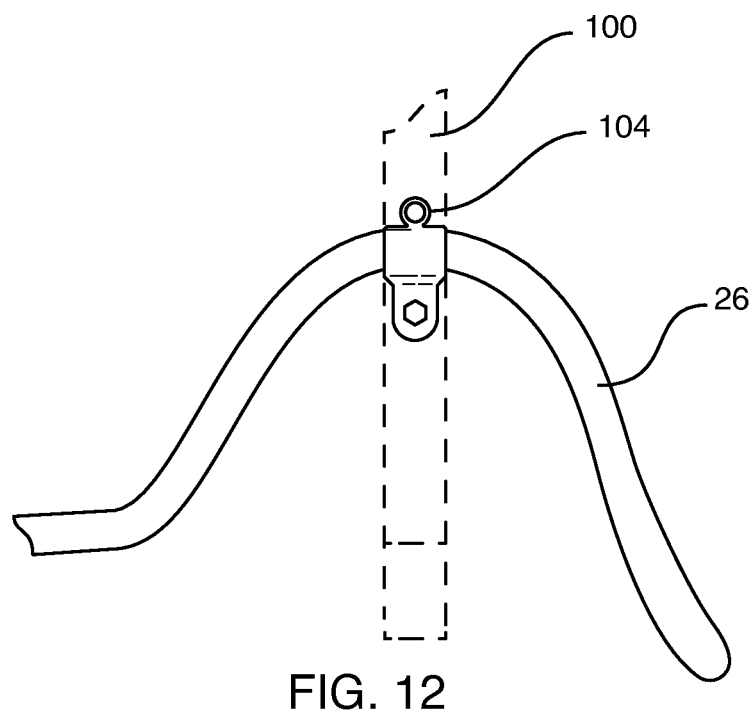
FIG. 12 shows a side view of a different configuration wherein a pivot bolt sleeve is welded to the pin.

Turning to FIG. 12, there is shown yet another configuration of the invention, Rather than having the pivot sleeve 104 clamped to the pin 26 as in FIGS. 10A-10C, the pivot sleeve may be welded to the pin. The lever may be attached in the same manner as discussed regarding FIGS. 10A-10C. It will be appreciated that welding the pivot sleeve 104 to the pin 26 may be advantageous over drilling a hole in the pin, as discussed in some of the configurations above, such as when the pin is relatively thin, or when the pin is made from a metal which is difficult to drill through. Likewise, welding the pivot sleeve 104 to the pin 26 may be advantageous over using a clamping mechanism in some situations.

Figure 13:
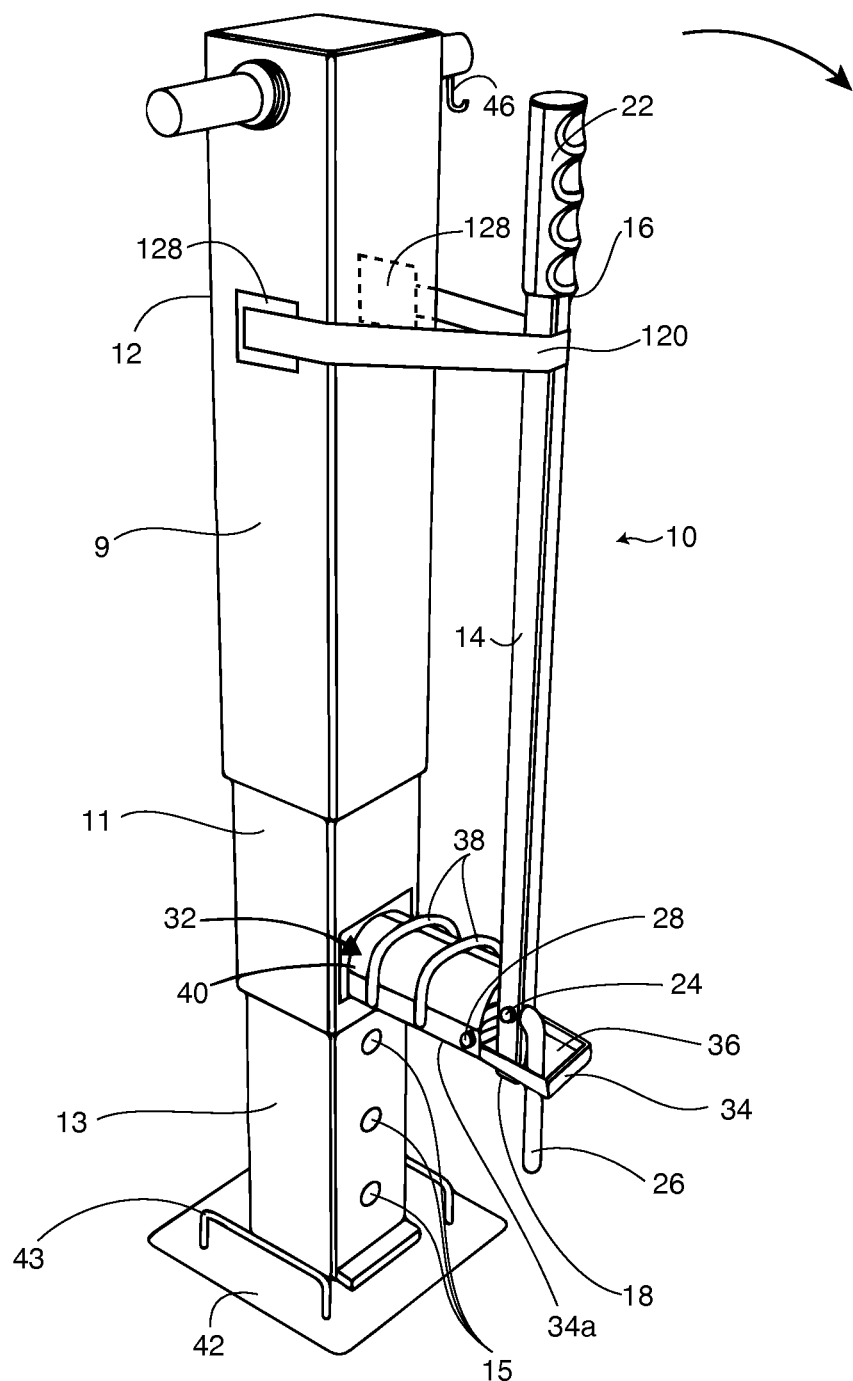
FIG. 13 a lever restraint for holding the lever during non-use or transport.

Turning now to FIG. 13, there is shown a perspective view of the jack similar to claim 2, with a retention system 120 being used to hold the lever 14 in an upright position.

The retention system 120 may include a strap 124 which can be connected to the body of the jack, such as to the outer/upper tube 9. The attachment may include a variety of fasteners, including but not limited to hook and loop fasteners, rings, hooks, etc. As shown in FIG. 13, one or more patch 128 of hook and loop fastener is adhesively attached to the upper/outer tube 9, and the strap has look and loop fastener disposed therein to engage the patch(es) 128. The strap 124 thus holds the lever 14 in a generally upright position so that the lever is not leaning backwards and applying pressure on the pin 26 to encourage it to move away from the middle/inner tube 11. The strap 124 can be tightened so that the backside of the lever engages the pin 26, thereby keeping the lever generally stationary and not bouncing back and forth due to road wind, etc.

Figure 14:
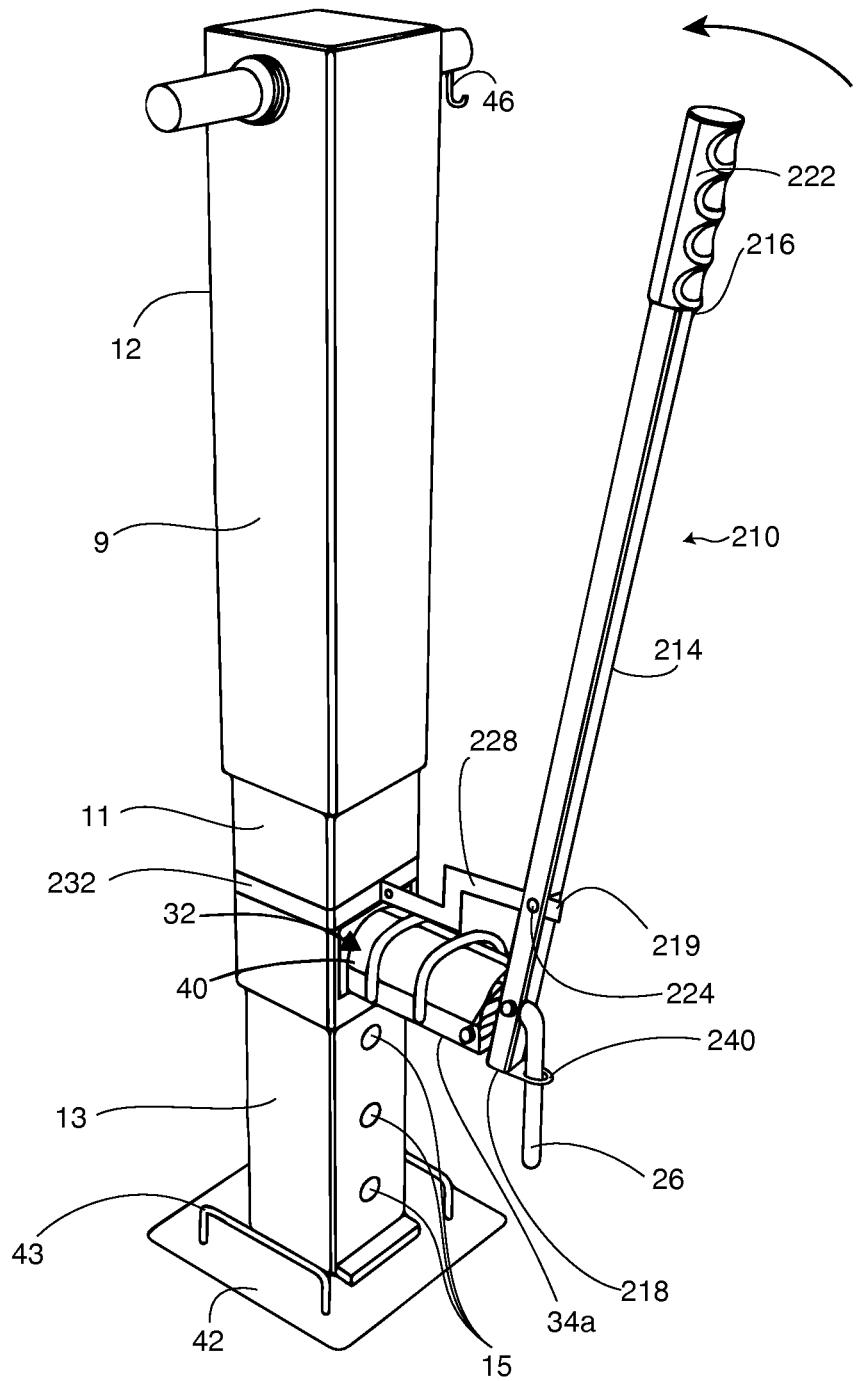
FIG. 14 shows an elevated perspective view of an alternate embodiment wherein the lever functions to move the plunger pin outwardly by moving the upper end of the lever toward the handle.

FIG. 14 shows a perspective view of an alternate configuration of a trailer jack plunger release system, generally indicated at 210 used on a trailer jack 12. As with the trailer jack 12 discussed previously, the trailer jack may include an upper/outer tubing member 9, a middle/inner tubing member 11, and a lower/innermost tubing member 13. The lower/innermost tubing member 13 may move relative to the middle/inner tubing member 11. The lower/innermost tubing member 13 may, for example, include a plurality of holes 15. A pin, such as plunger pin 26, selectively engages the holes to control extension of the lower/innermost tubing member 13. With the pin 26 removed, the lower/innermost tubing member 13 can either slide downwardly under its own weight, or can be pulled upwardly by a spring or other biasing member. If no biasing member is present, the user must typically lift the lower/innermost tubing member 13 upwardly when moving the trailer. If a biasing member is included, the lower/innermost tubing member 13 may move upwardly on its own, and the user must typically place a downward force on a foot plate 42 to extend the lower/innermost tube. The trailer jack 12 may also include a sleeve 40 which extends around the pin 26.

The improved lever system 210 may include a lever 214 (shown as a generally vertical bar) having a top or upper end 216 and a bottom or lower end 218. Disposed along the lever 214 may be a lever hole 219, a grip handle 222 attached at or adjacent the top end 216 of the lever, and a bolt 224 or other pivot designed to connect the lever 214 to a lever attachment member 228. The lever attachment member 228 holds the lever 214 to the jack 12 and allows the lever to pivot in such a way as to move the plunger pin 26 of the trailer jack 12.

Unlike the configurations shown in FIGS. 1-13, the lever 214 does not actuate the plunger pin 26 by pulling the upper end 216 of the lever away from the jack 12. To the contrary, the lever 214 moves the plunger pin 26 outwardly into an open position by moving the upper end 216 of the lever 214 toward the jack 12. This is accomplished by using a pivot point for the lever 214 (i.e. bolt 224) which is disposed above the plunger pin 26, rather than on or at the plunger pin as discussed in the previous configurations. Specifically, the lever 214 is attached by the pivot bolt 224 to the lever attachment member 228. As shown in FIG. 14, the lever attachment member 228 is attached to the middle/inner tube 11 of the jack 12 by a band 232. The lever attachment member 228 can be attached to the jack in a variety of ways.

The lever 214 may also include a plunger pin engagement member 240 which disposed at or adjacent the lower end 218 of the lever. The plunger pin engagement member 240 may extend outwardly from the body of the lever so as to engage the plunger pin 26. When the lower end of the lever 214 moves outwardly away from the jack 12, the plunger pin likewise moves away from the jack. As shown in FIG. 14, the plunger pin engagement member 240 is formed by a projection 244, which extends rearwardly from the lever 214. The projection has an opening 248 which receives the plunger pin. If the opening is completely surrounded by the projection 244 and is sized slightly larger than the diameter of the plunger pin 26, the plunger pin and the lower end 218 of the lever will move substantially in tandem. It will be appreciated, however, the it is not required that the projection 244 encircles the plunger pin 26, as it may only engage the plunger pin to move it into an open position by outward movement of the lower end of the lever, without affecting the return to the plunger pin should the lower end 218 of the lever move back toward the jack 12.

Figure 14A:
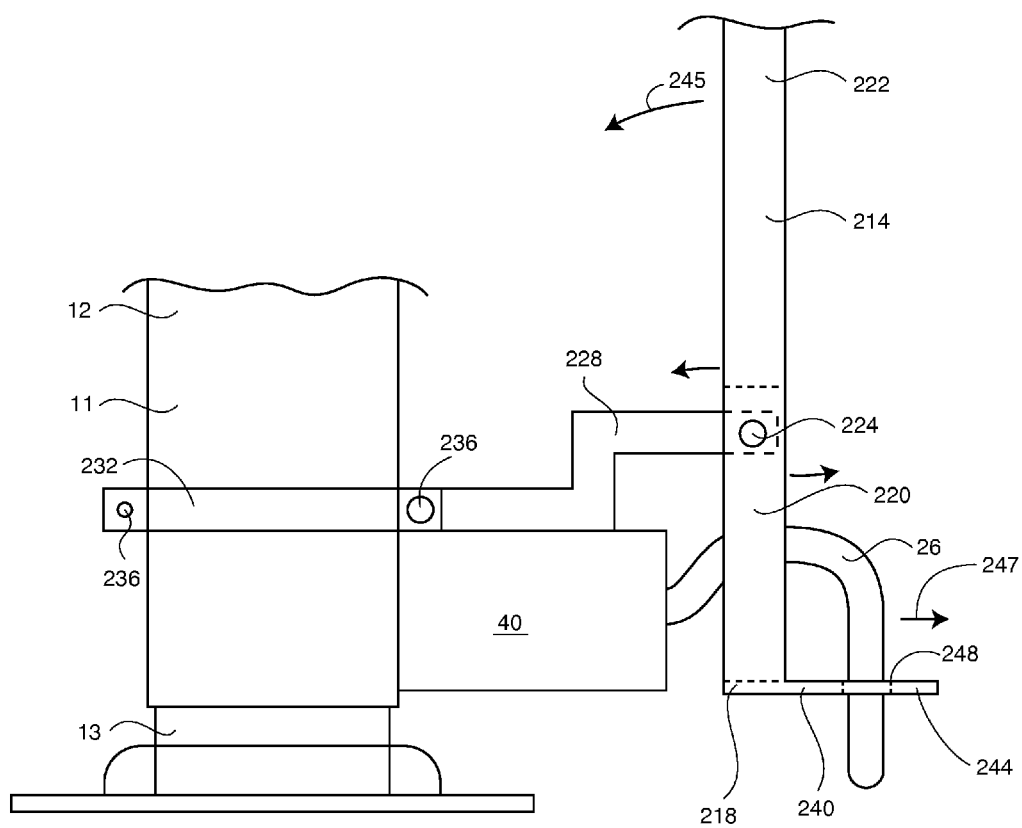
FIG. 14A shows a fragmented close-up side view of the embodiment shown in FIG. 14.

Turning now to FIG. 14A, there is shown a fragmented close-up, side view of the lever 214, lever attachment member 228 and the jack 12. At one end the lever attachment member 228 is attached to the lever 214 by the pivot bolt 224. At an opposing end, the lever attachment member 228 is attached to the jack 12 by a band or bracket 232 which wraps around the middle/inner tube 11 of the jack. In such a manner movement of the middle/inner tube 11 relative to the upper/outer tube 9 (FIG. 14) will not affect the lever 214 or the function thereof. It will be appreciated that the band or bracket 232 may include one of more fasteners 236 which hold the bracket together and which may allow for adjustments in size to accommodate a number of different jack sizes. It will also be appreciated that the band or bracket 232 and lever attachment member 228 may be formed of a single piece or may include multiple interconnected pieces.

As shown in FIG. 14 by dashed lines, the lower end 218 of the lever 214 may have a channel 220 which extends through the lower end. In use, the plunger pin 26 extends through the channel 220 in the lower end of the lever and curves downwardly through the opening 248 in the projection 244 forming the pin engagement member 240. One advantage of the present configuration is that the two points of contact for the lever (at pivot bolt 224) and at the pin engagement member 240, helps to secure the lever so it is less prone to wobbling during transport, etc.

In use the upper portion 222 of the lever 214 is moved toward the jack 12 as indicated by arrow 245 by pivoting about the pivot bolt 224. The inward movement of the upper portion 222 causes a corresponding outward movement of the lower end 218 and the pin engagement member 240, thereby causing an outward movement of the plunger pin 26, as represented by arrow 247. Because the pin engagement member 240 is not directly attached to the plunger pin 26, it is able to slide upwardly along the pin as the pin moves generally horizontally.

Figure 15:
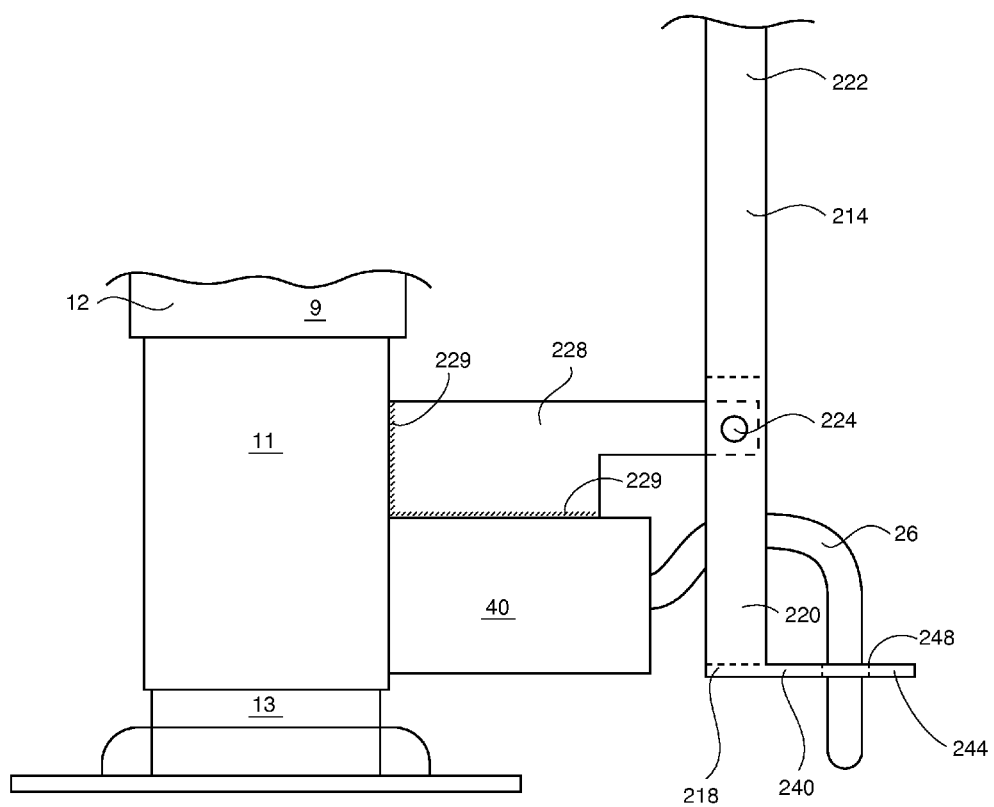
FIG. 15 shows a fragmented close-up side view of an alternate configuration wherein the lever is connect to the jack via an attachment member which is permanently attached to the jack.

Turning now to FIG. 15, there is shown an alternate configuration of the lever attachment member 228. Instead of being attached by a band or bracket to the jack 12, the lever attachment member 228 is permanently attached to the jack 12, such as by welding 229, an adhesive, etc. The attachment can be directly to the middle/inner tube 11 and/or to the sleeve 40 which extends along the plunger pin 26. Permanently attaching the lever attachment member 228 to the jack 12 has the disadvantage that it cannot be readily removed, but has the advantage that it will not inadvertently come off, such as falling off because the bolts have not been tightened, etc. (Thus, as used herein, it will be appreciated that "removably" attached refers to a situation in which the lever attachment member can be removed with hand tools and the like, while "permanently" attached means the lever attachment member will stay attached absent destructive methods such as cutting)

Figure 16:
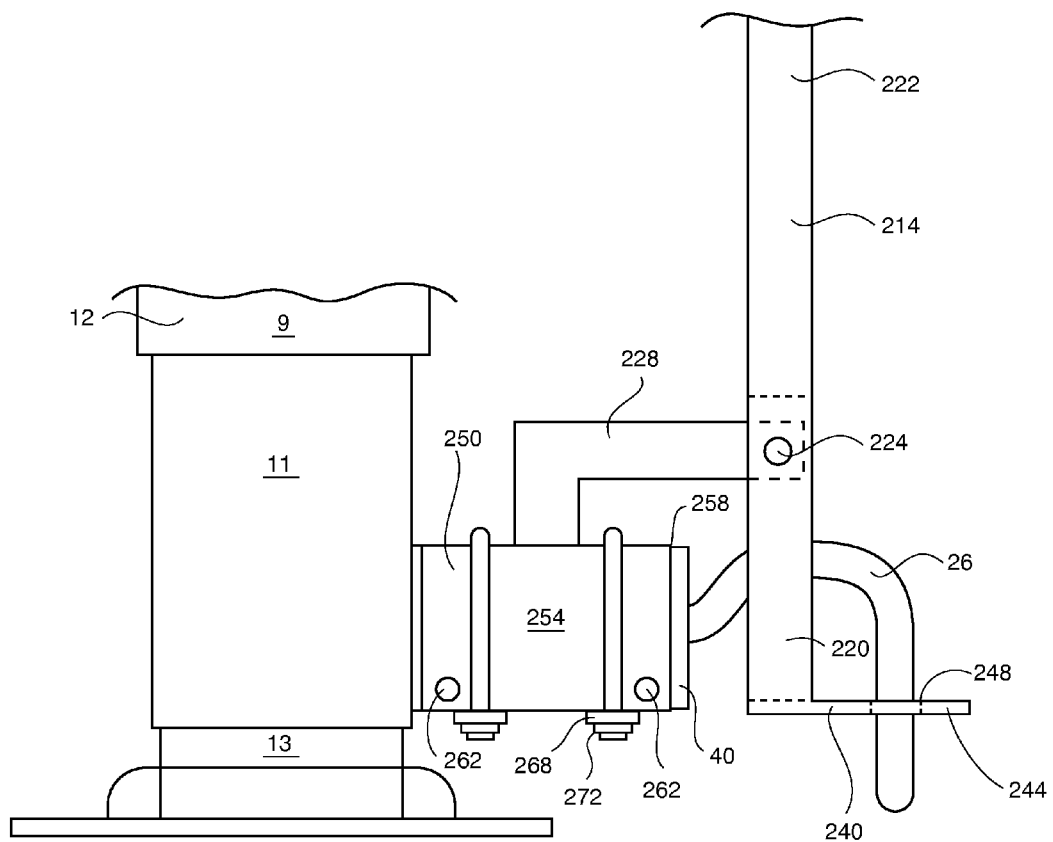
FIG. 16 shows a fragmented close-up side view an alternate configuration wherein the lever is attached to the jack by an attachment member which may be moveably attached to the jack.

FIG. 16 shows a number of other mechanisms for holding the lever attachment member 228 to the sleeve 240 which covers the plunger pin 26. The lever 214 is connected to the lever attachment member 228 by the pivot bolt 224 or some similar pivot structure. The lever attachment member 228 is attached to a mounting structure 250. The mounting structure 250 can be a bar, a cover 254 or shroud or other structure which can be held to the sleeve 40. For example, as a cover 254 the mounting structure may be arch-shaped and cover the sleeve 40. The mounting structure 250 can be held to the sleeve in a variety of ways such as: permanent attachment, i.e. a weld or adhesive 258; direct mechanical attachment, such as bolts 262 (with accompanying nuts) or rivets which extend through the mounting structure and sleeve; or by indirect attachment, such as U-bolts 264, plates 268 and nuts 272 which hold the mounting structure to the sleeve.

Figure 17:
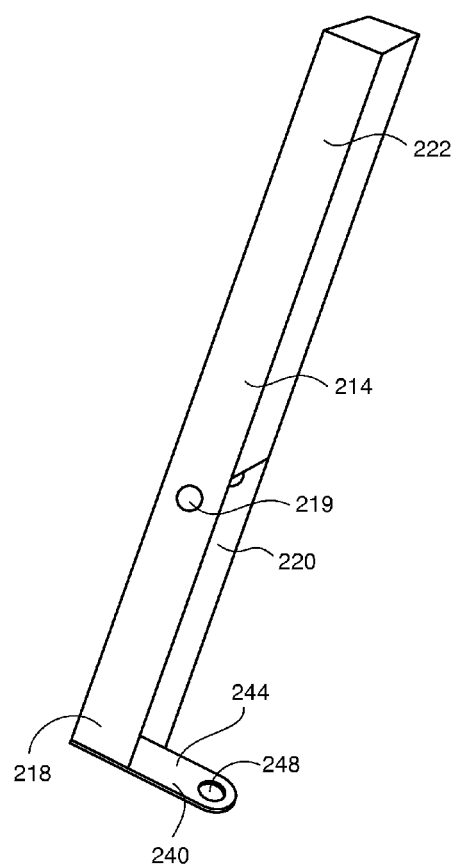
FIGS. 17 and 17A shows a side perspective view and a front end view of a lever as may be used in accordance with the principle of the present invention.
Figure 17A:
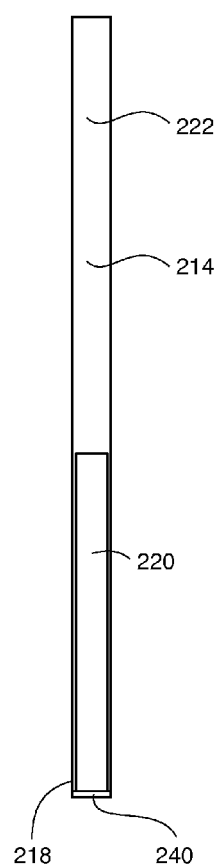

FIGS. 17 and 17A show perspective and end views, respectively, of the lever 214 removed from the jack 12 (FIG. 14). The lever 214 may include the upper end 222 and the lower end 218 which is formed to have a channel 220 extending therethrough. A lever hole 219 is provided for holding a pivot bolt (FIGS. 14-16) to connect the lever to the lever attachment member (FIGS. 14-16).

Disposed at or adjacent the lower end 218 is the pin engagement member 240 which may be formed by a projection 244 for engaging the pin and moving it outwardly as the lower end the lever 214 moves away from the jack (FIGS. 14-16). The projection 244 may include the opening 248 which is sized to receive the outer end of the pin as shown in FIGS. 14-16. If the opening is close in size to the diameter of the pin, this helps to stabilize the lever during transport, etc., so it does not pivot back and forth about the pivot bolt passing through the lever hole 219.

In order to mount the lever 214 on the jack as shown in FIGS. 14-16, the lever attachment member 228 is usually attached to the jack—either to the middle/inner tubing 11, or to the sleeve 40 about the pin 26. The outer end of the pin 26 is then advanced through the channel 220 of the lever 214 so that at least part of the pin is disposed outwardly from a portion of the pin engagement member 240. If the pin engagement member includes a projection 244 with an opening 248, the outer end of the pin 26 is advanced through the opening. The lever 214 is then aligned so that the lever hole 219 (or some equivalent structure) is aligned with a portion of the lever attachment member 228 which allows pivoting of the lever. Typically, this will be another hole in the lever attachment member, and a pivot bolt 224 will be extended through the lever hole 219 and the hole in the lever attachment member and then secured. This allows the lever 214 to pivot relative to the lever attachment member 228 and thereby move the plunger pin 26.

In addition to providing stability to the lever 214, one advantage of using a pin engagement member 240 which includes the opening 248 is that it provides an indication if the plunger pin has not properly retracted into the locking position. If, for some reason, the plunger pin 26 remains in an open, extended position, the upper end 222 of the lever 214 will remain in forward position toward the jack 12, indicating that the plunger pin is not in the correct position.

It will be appreciated that the present invention includes numerous different aspects and that the invention includes multiple elements which may or may not be present in any particular embodiment. For example, the invention may include a lever system for assisting in operation of a trailer jack having a plunger pin and a sleeve disposed about the plunger pin, wherein the lever system includes a lever having a top end and bottom end, and a lever hole adjacent the bottom end; a pivot structure (such as a bolt) designed to attach the lever to a plunger pin of the trailer jack, the bolt being inserted through the lever hole to a drilled hole of the plunger pin; and an engagement member engaging the sleeve and the lower end of the lever to limiting rotation of the lower end of the lever toward the sleeve.

The lever system may also include: the engagement member being a sleeve bolt designed to be inserted through a bottom portion of a sleeve of the trailer jack; a bracket plate attachable to the sleeve; at least one U-bolt designed to be positioned on a top portion of the sleeve and hold the bracket plate to the sleeve; the bracket plate has a slot formed therein for receiving a portion of the lever; the engagement member forms an abutment protruding from the lever arm for engaging the sleeve; the abutment being slidable relative to the sleeve; the lever having a slot formed therein at the lower end, and wherein then the lever is attached to the plunger pin, the plunger pin extends through the slot; the lever being bent; the lever being formed from a single piece of flat material which has been bent to form a channel at the lower end; and/or the lever being attached to the plunger pin by a clamp, and combinations thereof.

The attachment mechanism may include passing a bolt or other attachment member through the pin, clamping an attachment member to the pin, or welding the attachment member to the pin.

The invention also includes a trailer jack including a plurality of tubing members, as least one of the tubing members having holes and being slidable relative to another one of the plurality of tubing members; a plunger pin biased into engagement with one of the holes to selectively present the at least one of the tubing members from sliding relative to the other one of the plurality of tubing members; a sleeve disposed about the plunger pin; a lever attached to and pivotable relative to the plunger pin, the lever having an upper end and a lower end, the lower end pivoting toward the sleeve when the upper end is pulled away from the plurality of tubing members; and an engagement member disposed to contact the sleeve, the engagement member limiting advancement of the lower end of the lever toward the sleeve.

The trailer jack may further include: the engagement member having a plate attachable to the sleeve; the engagement member having a bolt passing through the sleeve; the engagement member having a protrusion extending from the lever; the lever being attached to the plunger pin by a pivot structure extending through the plunger pin; and/or the lever being attached to the plunger pin by a clamp, or combinations thereof.

The invention also includes a method of moving a plunger pin of a trailer jack, the method which includes: attaching a lever to a plunger pin so that the lever has an upper end, and a lower end, the lower end extending below a portion of the plunger pin; rotating the lever arm so that the upper end moves away from the trailer jack and the lower end moves toward the trailer jack; and engaging the lower end to limit rotation of the lower end and thereby move the plunger pin away from the trailer jack. The method may also include attaching the lever to the plunger pin includes drilling a hole in the plunger pin and/or engaging the lower end to limit rotation of the lower end by attaching an engagement member to a sleeve around the plunger pin. The lever may also be attached by a clamping mechanism or by a welding a structure to the pin and then passing a pivot structure, such as a pivot bolt through the lever and the structure.

Other configurations of the invention may include a lever system for assisting in operation of a trailer jack having a plunger pin the lever system which includes a lever having an upper end and lower end, the lower end having channel extending therethrough and a pin engagement member extending therefrom. The lever system may further include: the pin engagement member having a projection and an opening; the opening being sized slightly larger than a diameter of the plunger pin adjacent the outward end of the plunger pin so as to be configured to receive the outer end of the plunger pin through the opening; the opening forming a hole through the projection; a lever attachment member for attaching the lever to the jack; the lever attachment member being permanently attached to the trailer jack; the trailer jack having a sleeve disposed about the plunger pin and wherein the lever attachment member is attached to the sleeve; the lever attachment member having a mounting structure configured for attachment to a sleeve of a trailer jack; the mounting structure having a generally arch-shaped cross-section for forming a housing over a trailer jack sleeve; the mounting structure being removably attached to a sleeve of a trailer jack; and/or the sleeve bolt being designed to be inserted through a bottom portion of a sleeve of the trailer jack, or combinations thereof.

In accordance with the invention, a trailer jack having a lever system attached thereto, the trailer jack may include a plurality of telescoping tubes which extend to change the height of the jack, a plunger pin for selectively limiting the telescoping of the plurality of telescoping tubes, a sleeve disposed about the plunger pin, and a lever system having a lever having an upper end and a lower end, channel extending through the lever along the lower end, and a pin engagement member disposed on the lower end for engaging the plunger pin outwardly from the lever. It may further include: the lever system further having lever attachment member attached to the sleeve and to the lever to hold the lever in pivotable engagement with the jack; the lever attachment member having a mounting structure which is permanently attached to the sleeve; the lever attachment member having a mounting structure which is removably attached to the sleeve; and/or the mounting structure being arch-shaped, or combinations thereof.

In accordance with the invention, a method of disposing a lever on a trailer jack, may include, selecting a trailer jack having a plunger pin; selecting a lever having an upper end and a lower end, the lower end having a channel extending therethrough and a pin engagement member disposed on an outer side of the lever, attaching a lever attachment member to the trailer jack and advancing the plunger pin through the channel so that the plunger pin extends outwardly belong the body of the plunger pin and into engagement with the pin engagement member, and attaching the lever to the lever attachment member. The method may further include: pin engagement member having an opening formed therein and wherein an outer end of the plunger pin is advanced through the opening.

Furthermore it will be appreciated that other inventions are hereby disclosed. While the present application shows several different representative configurations, the invention may be embodied in other forms without departure from the spirit and essential characteristics thereof. The embodiments described therefore are to be considered in all respects as illustrative and not restrictive. Although the present invention has been described in terms of certain presently preferred embodiments, other embodiments that are apparent to those of ordinary skill in the art are also within the scope of the invention. For example, components of the lever system can be varied in size, materials, shape, form, function, manner of operation and assembly in accordance with the intended use. Accordingly, it is not intended that the invention be limited, except as by the appended claims.

What is claimed is:

1. A lever system for assisting in operation of a trailer jack having a plunger pin which selectively prevents extension of the trailer jack, the lever system comprising:
   a lever having an upper end and a lower end, the lower end having a channel extending therethrough and a pin engagement member extending therefrom for engaging the plunger pin of the trailer jack and a pivot disposed adjacent the lower end for enabling the lever to pivot between a first position and second position wherein the lever pulls the plunger pin to selectively allow extension of the trailer jack.

2. The lever system of claim 1, wherein the pin engagement member comprises a projection and an opening.

3. The lever system of claim 2, wherein the opening is sized slightly larger than a diameter of the plunger pin adjacent the outward end of the plunger pin so as to be configured to receive the outer end of the plunger pin through the opening.

4. The lever system of claim 2, wherein the opening forms a hole through the projection.

5. The lever system of claim 1, wherein the lever system further comprises a lever attachment member for attaching the lever to the trailer jack.

6. The lever system of claim 5, wherein the lever attachment member is permanently attached to the trailer jack.

7. The lever system of claim 5, wherein the trailer jack has a sleeve disposed about the plunger pin and wherein the lever attachment member is attached to the sleeve.

8. The lever system of claim 5, wherein the lever attachment member comprises a mounting structure configured for attachment to a sleeve of the trailer jack.

9. The lever system of claim 8, wherein the mounting structure has a generally arch-shaped cross-section for forming a housing over a trailer jack sleeve.

10. The lever system of claim 8, wherein the mounting structure is removably attached to the sleeve of the trailer jack.

11. A trailer jack having a lever system attached thereto, the trailer jack comprising:
   a plurality of telescoping tubings which extend to change the height of the trailer jack;
   a plunger pin for selectively limiting the telescoping of the plurality of telescoping tubings; and
   a sleeve disposed about the plunger pin; and
   the lever system comprising:
   a lever having an upper end and a lower end, a channel extending through the lever along the lower end, and a pin engagement member disposed on the lower end for engaging the plunger pin outwardly from the lever, and wherein the lever system further comprises a lever attachment member attached to the sleeve and to the lever to hold the lever in pivotable engagement with the trailer jack.

12. The trailer jack of 11, wherein the lever attachment member comprises a mounting structure which is permanently attached to the sleeve.

13. The trailer jack of 11, wherein the lever attachment member comprises a mounting structure which is removably attached to the sleeve.

14. The trailer jack of claim 12, wherein the mounting structure is arch-shaped.

15. A method of disposing a lever on a trailer jack, the method comprising:
   selecting a trailer jack having a plunger pin and a lever having an upper end and a lower end, the lower end having a channel extending therethrough and a pin engagement member extending therefrom, and a pivot disposed adjacent the lower end for enabling the lever to pivot between a first position and second position wherein the lever pulls the plunger pin to selectively allow extension of the trailer jack;
   attaching a lever attachment member to the trailer jack; and
   advancing the plunger pin through the channel so that the plunger pin extends outwardly belong the body of the plunger pin and into engagement with the pin engagement member; and
   attaching the lever to the lever attachment member.

16. The method of claim 15, wherein the pin engagement member has an opening formed therein and wherein an outer end of the plunger pin is advanced through the opening.

17. The trailer jack of claim 14, wherein the mounting structure is arch-shaped.

18. The lever system of claim 1, wherein the pin engagement member comprises a projection defining a hole therethrough, the hole sized to receive an outer end of the plunger pin; and
   a lever attachment member comprising a mounting structure with a generally arch-shaped cross section configured to attach to a sleeve of the trailer jack.

19. The lever system of claim 18, wherein the mounting structure comprises at least one U-bolt and a bracket plate, the bracket plate defining a slot for receiving a portion of the lever to limit rotation of the lower end of the lever toward the sleeve.

20. The trailer jack of claim 11, the plunger pin having an outer end, wherein the pin engagement member comprises a projection defining a hole therethrough, the hole sized to receive the outer end of the plunger pin; and
   a lever attachment member comprising a mounting structure, the mounting structure comprising at least one U-bolt and a bracket plate attached to the bottom of the sleeve, the bracket plate configured to limit rotation of the bottom end of the lever toward the sleeve.

21. A lever system for engaging a plunger pin on a trailer jack to change the height of the trailer jack comprising:
   a lever having a top end and a bottom end;
   a lever hole proximal to the bottom end for the plunger pin to extend therethrough;
   a bolt proximal to the bottom end of the lever with a hole therethrough to receive the plunger pin;
   a sleeve disposed around the plunger pin; and
   a bracket plate mounted to the sleeve, the bracket plate defining a slot to receive a portion of the lever proximate to the bottom end to limit rotation of the bottom end of the lever toward the sleeve.

* * * * *